(12) United States Patent
Yasuyuki

(10) Patent No.: US 7,513,703 B2
(45) Date of Patent: Apr. 7, 2009

(54) MAGNETIC ACTUATOR AND LIGHT QUANTITY ADJUSTING DEVICE

(75) Inventor: Higashiyama Yasuyuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/948,460

(22) Filed: Nov. 30, 2007

(65) Prior Publication Data

US 2008/0137348 A1    Jun. 12, 2008

(30) Foreign Application Priority Data

Dec. 11, 2006    (JP) .............................. 2006-332875

(51) Int. Cl.
- *G03B 9/02* (2006.01)
- *H01F 7/08* (2006.01)
- *H01F 7/14* (2006.01)

(52) U.S. Cl. ..................... 396/508; 335/272; 310/36

(58) Field of Classification Search ............ 310/36–38, 310/49 R; 335/272; 359/378–340; 396/463, 396/508

See application file for complete search history.

(56) References Cited

U.S. PATENT DOCUMENTS

| | | | | |
|---|---|---|---|---|
| 4,795,929 A | * | 1/1989 | Elgass et al. .................. 310/36 |
| 5,592,136 A | * | 1/1997 | Katagiri ....................... 335/272 |
| 6,926,454 B1 | * | 8/2005 | Naganuma et al. .......... 396/463 |
| 6,960,848 B2 | * | 11/2005 | Naganuma et al. ............ 310/37 |
| 6,981,807 B2 | * | 1/2006 | Naganuma et al. .......... 396/463 |
| 2005/0116800 A1 | * | 6/2005 | Nelson ........................ 335/272 |
| 2006/0267421 A1 | * | 11/2006 | Aoshima .................. 310/49 R |
| 2007/0090698 A1 | * | 4/2007 | Yasuda ..................... 310/49 R |

FOREIGN PATENT DOCUMENTS

| JP | U 7-19740 | 4/1995 |
|---|---|---|
| JP | 8-19239 | 1/1996 |

* cited by examiner

*Primary Examiner*—Ramon M Barrera
(74) *Attorney, Agent, or Firm*—Fitzpatrick, Cella, Harper & Scinto

(57) ABSTRACT

A magnetic actuator according to the present invention includes a stator yoke made of a magnetic substance and having projecting streaks on the inner circumference thereof to produce magnetic bias to a rotor magnet. The stator yoke is fitted into and fixed to a coil bobbin, a base plate, or a sheet metal having a concave portion formed therein. This can hold shading members to a totally closed position after shutoff of electric current through a coil and can stably achieve an appropriate position of the stator yoke in a rotation direction to eliminate the need for fixing the stator yoke with an adhesive or the like.

13 Claims, 8 Drawing Sheets

(a) Totally closed  (b) Intermediate  (c) Totally opened

MAGNETIC ACTUATOR AND LIGHT QUANTITY ADJUSTING DEVICE

BACKGROUND OF THE INVENTION

1. Field of the Invention

The present invention generally relates to a magnetic actuator and a light quantity adjusting device including the magnetic actuator, and more particularly, to a diaphragm driving device used for controlling a lens aperture in accordance with a received light quantity in a video camera, a digital camera or the like.

2. Description of the Related Art

Aperture blades serve as a shading member of a light quantity adjusting device used for controlling a lens aperture in accordance with a received light quantity in a video camera, a digital camera or the like and are typically configured such that the blades are arranged in a pair and relatively moved to adjust the light quantity.

An exemplary magnetic actuator for actuating aperture blades is shown in FIG. 8. The actuator includes a coil bobbin (which consists of two portions divided in a vertical direction, an upper bobbin 101a and a lower bobbin 101b) 101 for winding a coil (not shown) thereon, the coil wound around the bobbin 101, an actuating lever 102 for actuating aperture blades (not shown), a rotor magnet 103 fixed to the actuating lever 102 for rotating the actuating lever 102, and a tubular yoke 104 for forming a path along which magnetic flux produced by the passage of electric current through the coil passes, that is, a magnetic path. The rotor magnet 103, fixed to the actuating lever 102, and the bobbin 101, around which the coil is wound, are housed in the yoke 104 (see Japanese Patent Laid Open No. H8(1996)-019239).

In the magnetic actuator, torque of the rotor magnet 103 produced by the passage of electric current through the coil is transmitted via the actuating lever 102 to a pair of aperture blades, not shown, as an actuating force therefor. The pair of aperture blades is slidably supported on a base plate, not shown, having a light passing port formed therein. Engaging pins 102a formed at both ends of the actuating lever 102 are fitted into through-holes formed in the respective aperture blades. The actuating lever 102 is rotated to drive the pair of aperture blades in parallel in opposite directions to change the area of the opening of the light passing port.

In a light quantity adjusting device with a magnetic actuator of the abovementioned type, the magnetic bias in the yoke 104 is used to maintain the pair of aperture blades serving as the shading member at a totally closed position after the power is shut off. As shown in FIG. 8, the magnetic bias of magnetic flux is provided by a slit formed in the yoke 104.

FIGS. 7(a) to 7(c) show the a diaphragm driving device in which the rotor magnet 103 is urged in one rotation direction by the magnetic bias of magnetic flux produced in end faces forming the slit 105 provided in the stator yoke 104.

Since the magnetic flux readily passes through the yoke 104, magnetic paths are formed as shown by arrows in FIGS. 7(a) to 7(c). The magnetically stablest state in the yoke 104 is achieved when a line P-P' connecting the center of the yoke 104 with the center of the slit 105 coincides with the boundary between the poles of the rotor magnet 103. The position closest to the coincident state is defined as a totally closed position shown in FIG. 7(a). At the totally closed position, the magnetic bias provides a force in a counterclockwise direction (close direction) shown by an arc-shaped arrow in order to hold the shading member totally closed.

When electric current is passed through the coil, a magnetic circuit is formed from the N pole through the one of the end surfaces of the slit 105 (an intermediate position shown in FIG. 7(b)), and the rotor magnet 103 is rotated in a clockwise direction in accordance with the passed electric current against the magnetic bias force. When the passed electric current is increased, the rotor magnet 103 is rotated to a totally opened position shown in FIG. 7(c).

In Laid-open Japanese Utility Model Registration Application No. H7 (1995)-019740, a magnetic actuator is configured such that a rotor magnet is rotated in one direction and held at a predetermined position by using a magnetic bias force when electric current through a coil is shut off. A magnetic substance (pin) is included separately from a yoke on the outer circumference of a bobbin or on the inner circumference of the yoke to provide magnetic bias similar to that in Japanese Patent Laid-Open No. H8 (1996)-019239 described above, thereby attaining the similar effects.

In the magnetic actuator with the stator yoke (referred to as a slit yoke) having the slit disclosed in the abovementioned Japanese Patent Laid-Open No. H8(1996)-019239, however, the stator yoke has a low radial crushing strength and thus the yoke is prone to deformation if an external force is applied thereto. When a number of manufactured yokes having slits are stored n one place, an edge of a slit yoke may enter the slit portion of an adjacent yoke, and the yokes may get snagged on each other and may be deformed when a user pulls them out. In addition, the slit of the yoke tends to cause magnetic saturation more quickly than in a yoke having no slit.

The yoke is also prone to deformation and damage in assembly of the magnetic actuator, which may degrade the magnetic property of the magnetic circuit formed of the stator yoke and the magnet to reduce the driving torque. In this case, the shading member may not be closed completely and thus the light may not be blocked perfectly.

In the magnetic actuator with the slit yoke described above, after the bobbin is put into the yoke, the slit needs to be placed at an appropriate position through fine adjustments to cause the actuating lever to be in the totally closed state and then the yoke should be bonded to the bobbin with an adhesive or the like.

When a magnetic substance different from the yoke is provided on the inner circumference of the yoke or on the outer circumference of the bobbin as disclosed in Laid-open Japanese Utility Model Registration Application No. H7 (1995)-019740, the magnetic substance needs to be bonded to the yoke or the bobbin at an appropriate position to cause the actuating lever to be in the totally closed state. This results in an additional number of parts and an extra cost due to an increase in the number of manhours required for manufacture.

The yoke has a slight irregular magnetic bias even in a cylindrical shape. Even when the magnetic substance is bonded at the appropriate position, the abovementioned characteristic disadvantage occurs if the yoke is rotated later. To prevent this, the yoke should be fixed with an adhesive or the like to prevent a change in position of the yoke relative to the magnetic substance, which may take extra time and effort.

SUMMARY OF THE INVENTION

It is an object of the present invention to make it possible to use a cylindrical stator yoke with no slit and to eliminate final position adjustment for appropriately positioning the rotation range of a rotor magnet in assembly. It is another object to provide a magnetic actuator capable of holding a rotor magnet at a predetermined position relative to a stator yoke with a magnetic bias force when no electric current is passed through a coil.

It is a yet another object of the present invention to provide a light quantity adjusting device capable of appropriately controlling a shading member by simply mounting a stator yoke forming part of a magnetic actuator on a bobbin or a holding member of an actuating portion.

To achieve the abovementioned objects, the present invention provides a magnetic actuator including:

- a rotor magnet which is formed of a rotatable permanent magnet;
- a rotation limiting member which has a rotation limiting portion for limiting a rotation range of the rotor magnet;
- a stator yoke which is formed in a generally cylindrical shape, is placed around a rotation axis of the rotor magnet, and has at least one protruding portion which protrudes toward the rotor magnet for producing an urging force based on magnetic bias between the stator yoke and the rotor magnet and a positioning portion for positioning to the rotation limiting member; and
- a coil which is placed inside the stator yoke and opposite to the rotor magnet and produces magnetism for actuating the rotor magnet.

To achieve the abovementioned objects, according to another aspect, the magnetic actuator includes the stator yoke having the protruding portion formed integrally to have a larger thickness in section than in the remaining portion of the generally cylindrical shape, and the stator yoke is formed through compression molding with a powder metallurgy molding technique including the protruding portion and the positioning portion.

To achieve the abovementioned objects, the present invention provides a light quantity adjusting device including:

- a shading member which is moved relative to a base plate having an aperture formed therein to control a light quantity;
- a magnetic actuator which provides an actuating source for moving the shading member with a rotor magnet formed of a rotatable permanent magnet; and
- a power transmitting member which is rotated together with the rotor magnet to actuate the shading member, wherein the magnetic actuator includes:

the rotor magnet which is formed of the rotatable permanent magnet;

- a rotation limiting member which has a rotation limiting portion for limiting a rotation range of the rotor magnet;
- a stator yoke which is formed in a generally cylindrical shape, is placed around a rotation axis of the rotor magnet, and has at least one protruding portion which protrudes toward the rotor magnet for producing an urging force based on magnetic bias between the stator yoke and the rotor magnet and a positioning portion for positioning to the rotation limiting member; and
- a coil which is placed inside the stator yoke and opposite to the rotor magnet and produces magnetism for actuating the rotor magnet.

To achieve the abovementioned objects, according to another aspect, the light quantity adjusting device includes the shading member held at a totally closed position where the shading member completely closes the aperture by the urging force based on the magnetic bias in shutoff of electric current through the coil.

A detailed configuration of the magnetic actuator and the light quantity adjusting device of the invention, the above and other objects and features of the invention will be apparent from the embodiments described below.

DETAILED DESCRIPTION OF THE PREFERRED EMBODIMENTS

Hereinafter, preferred embodiments of the invention will be described in detail with reference to the drawings.

FIGS. 1 to 5 show preferred embodiments of the present invention.

Figure 1:
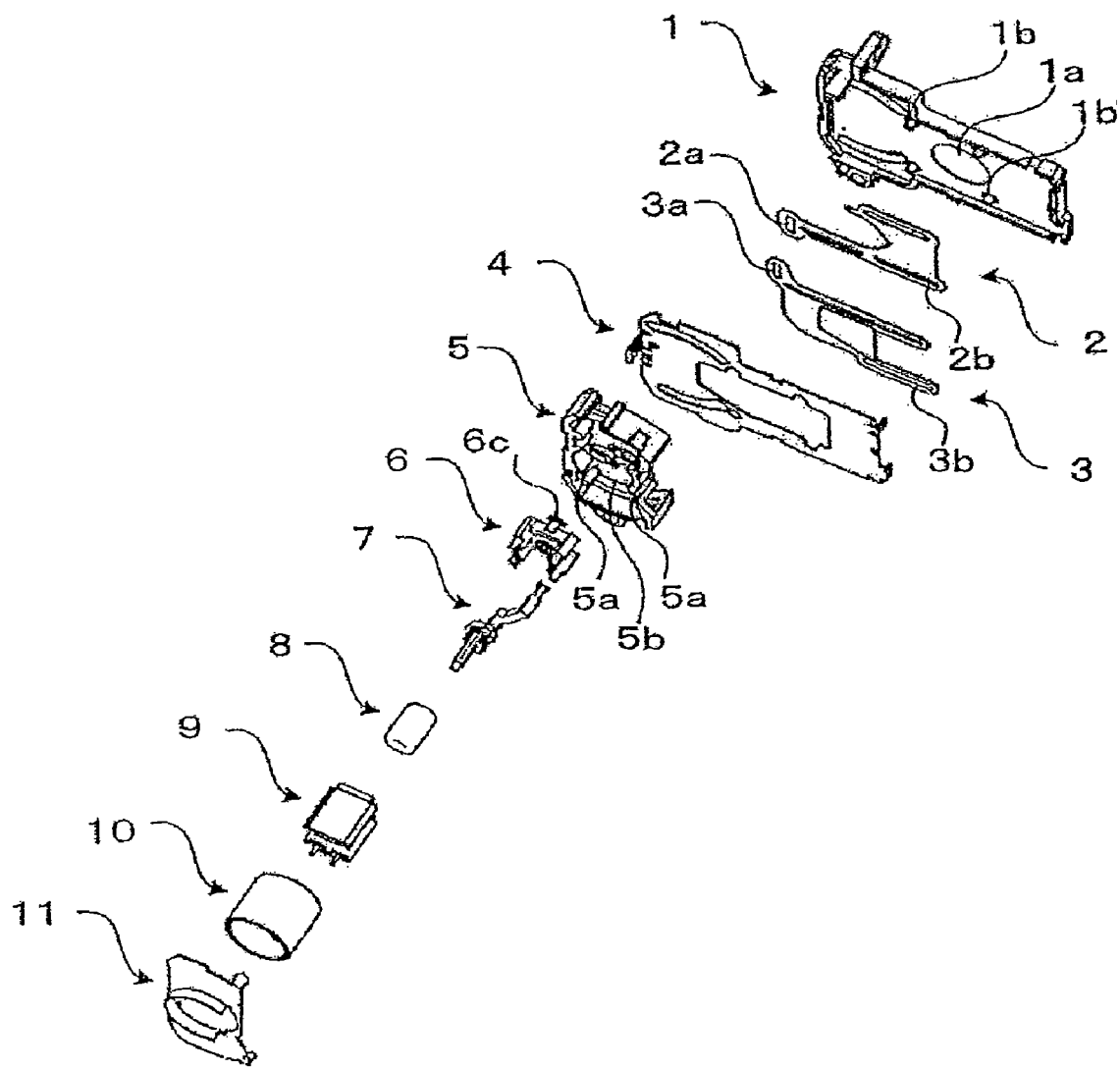
FIG. 1 is an exploded perspective view showing a light quantity adjusting device which is an embodiment of the present invention.

FIG. 1 is an exploded perspective view showing a magnetic actuator and a light quantity adjusting device for a video camera in which the magnetic actuator is used as a power source.

Figure 2:
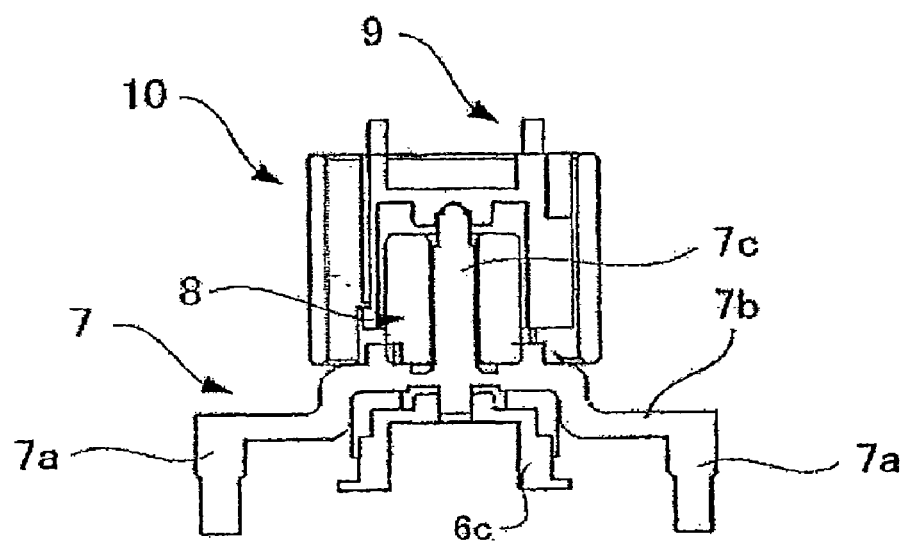
FIG. 2 is a longitudinal section view showing a magnetic actuator in FIG. 1.
Figure 3:
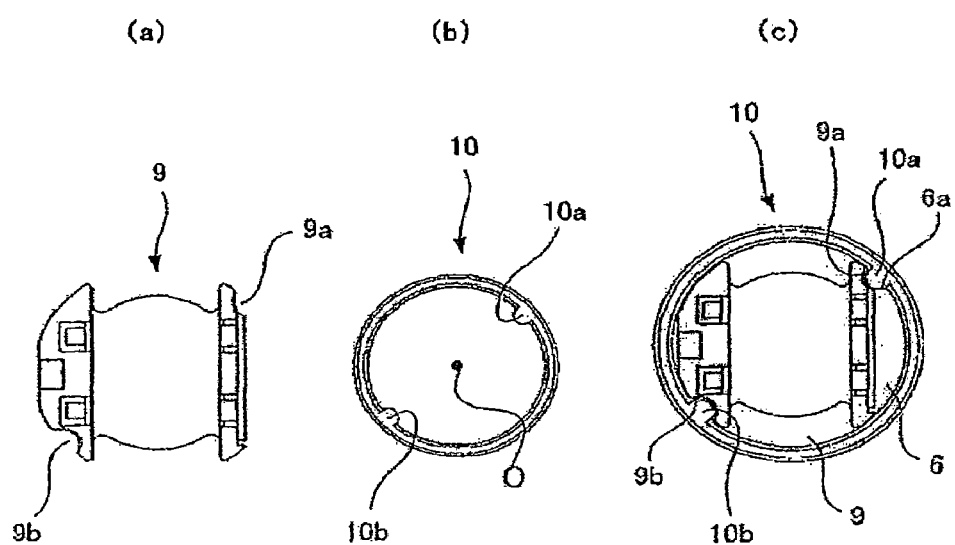
FIG. 3(a) shows concave portions of a second coil bobbin shown in FIG. 1.
FIG. 3(b) is a front view showing a stator yoke.
FIG. 3(c) shows the coil bobbin fitted into the stator yoke.

In FIGS. 1 and 2, a driving coil forming part of the magnetic actuator is omitted, but the coil is wound in parallel with a rotation axis around a coil bobbin formed of a combination of two portions, a first coil bobbin portion 6 and a second coil bobbin portion 9. The coil bobbin is positioned and fixed to a meter base plate 5 via a protrusion 6c formed on the first coil bobbin portion 6 to constitute the magnetic actuator. The meter base plate 5 is positioned and fixed to a base plate 1 having an opening portion 1a formed therein to constitute the light quantity adjusting device.

Figure 4:
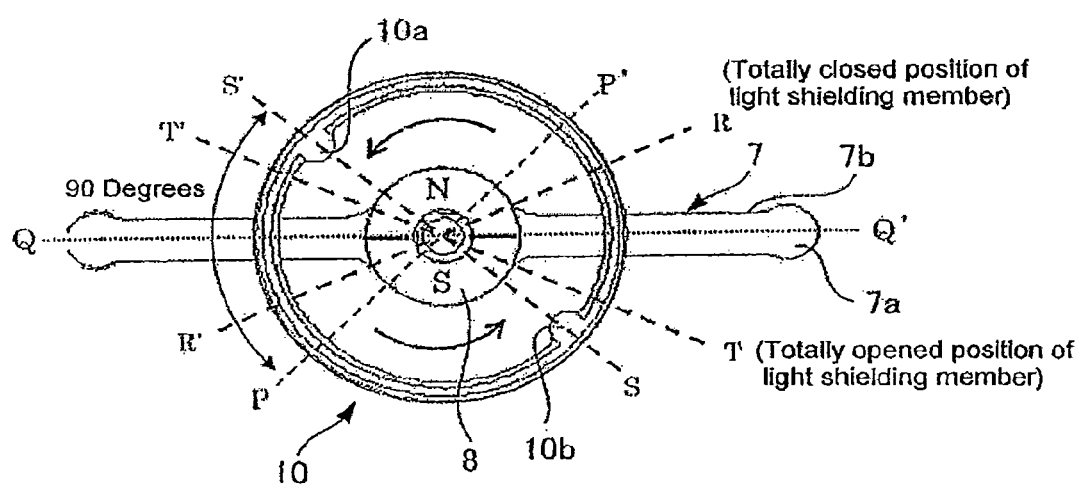
FIG. 4 is a diagram for explaining a force caused by a magnetic bias acting between the stator yoke and a rotor magnet shown in FIG. 1 and a movable range of a shading member.
Figure 5:
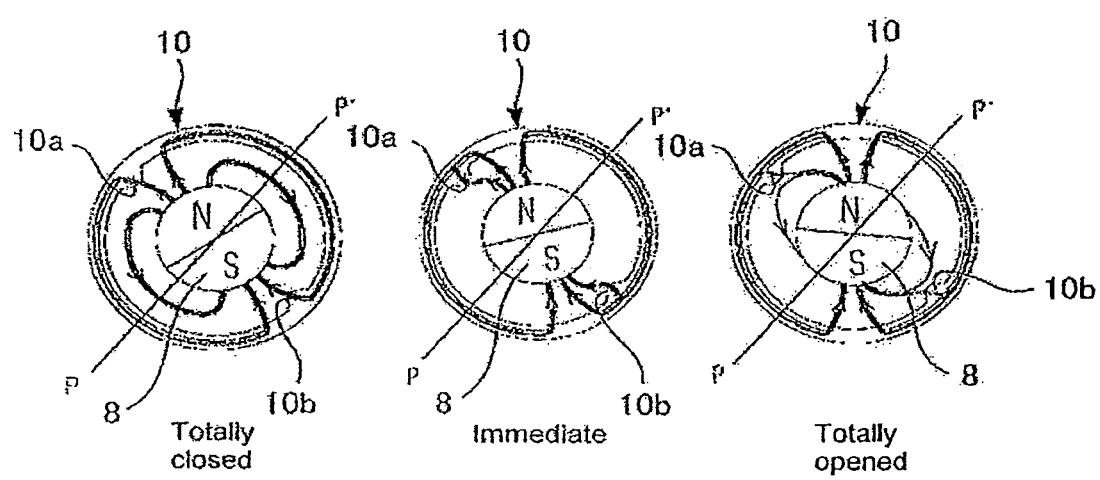
FIGS. 5(a) to 5(c) are diagrams for explaining operation of the magnetic actuator and a shading member in a totally closed state, an intermediate state, and a totally opened state shown in FIG. 4.

Reference numeral 8 shows a rotatable rotor magnet (permanent magnet) having its center coaxial with a stator yoke 10 and polarized in a circumferential direction. Reference numeral 7 shows an actuation transmitting lever serving as a power transmitting portion and including a lever body 7b having engaging pins 7a formed at both ends. A rotation axis portion 7c formed at the center of the lever body 7b in a longitudinal direction is passed through and fixed to the rotor magnet 8 with a press fit or the like. The passed end portion of the rotation axis portion 7c is pivotally supported on the second coil bobbin portion 9. The power transmitting portion may be formed integrally with the rotor magnet 8. The S pole and the N pole of the rotor magnet 8 are formed symmetrically with respect to the axis position in the diameter direction orthogonal to the rotation center axis along which the actuation transmitting lever 7 extends. When the axis penetrating the plane of the drawing sheet of FIG. 4 is used as the rotation center axis of the actuation transmitting lever 7 as shown in FIG. 4, the S pole and the N pole are divided in a vertical direction. In providing the light quantity adjusting device as shown in FIG. 1, the engaging pins 7a are fitted into engaging holes 2a and 3a of shading members 2 and 3 movable between the base plate 1 and an aperture stop case 4 to open or close the opening portion 1a of the base plate 1.

The rotation range of the actuation transmitting lever 7 is limited by the lever body 7b abutting on rotation limiting portions 5a formed on the meter base plate 5 serving as a rotation limiting member to which the first coil bobbin portion 6 is positioned and fixed. The rotation angle of the rotor magnet 8 is also limited thereby. In the embodiment, the rotation limiting portions 5a are formed at the ends of a hole portion 5b in which the engaging pins 7a of the actuation transmitting lever 7 pass through the meter base plate 5. However, the rotation limiting portions 5a have similar effects if they are formed in a different portion of the meter base plate 5.

Reference numeral 10 denotes the stator yoke formed of a ferromagnet and providing a path along which magnetic flux produced by the passage of electric current through the coil passes, that is, a magnetic path.

In the embodiment, the stator yoke 10 is formed in a cylindrical shape with no crack over the entire circumference. As shown in FIG. 3(b), projecting streaks 10a and 10b having a convex shape in cross section are formed on the inner circumference of the stator yoke 10 on the diameter line passing through a central axis O to protrude toward the central axis O and to extend along the axis direction of the rotor magnet 8 opposite to each other along the axis direction.

The second coil bobbin portion 9 is put in the stator yoke 10. As shown in FIG. 3(a), a concave portion 9a is formed to engage with part of the projecting streak 10a and a concave portion 9b is formed along the axis direction to engage with the other projecting streak 10b at opposite positions in the outer circumference of the second coil bobbin portion 9. In the embodiment, a concave portion 6a is also formed in the first coil bobbin portion 6 to engage with the other portion of the projecting streak 10a. As shown in FIG. 3(c), the concave potion 6a of the first coil bobbin portion 6 is prevented from rotation in a counterclockwise direction with the projecting streak 10a, while the concave portion 9a of the second coil bobbin portion 9 is prevented from rotation in a clockwise direction with the projecting streak 10a. As a result, the coil bobbin is fixed to the stator yoke 10 such that it is unmovable in the rotation direction of the rotor magnet 8.

As described above, the first coil bobbin portion 6 and the second coil bobbin portion 9 are positioned and fixed to the meter base plate 5. Thus, the paired projecting streaks 10a and 10b of the stator yoke 10 are positioned with respect to the rotation limiting portion formed in the meter base plate 5 through the concave portion 6a of the first coil bobbin portion 6 and the concave portions 9a and 9b of the second coil bobbin portion 9. In the embodiment, the rotation limiting portion is formed in the meter base plate 5, and the first coil bobbin portion 6 and the second coil bobbin portion 9 fixed to the meter base plate 5 are used to position the stator yoke 10, thereby positioning the rotor magnet 8 and the stator yoke 10. However, it is possible to position the stator yoke 10 by providing a positioning portion similar to the concave portions 6a, 9a, and 9b formed in the first and second bobbin portions 6 and 9 for a sub base plate like the meter base plate 5 in FIG. 1.

It goes without saying that such a positioning portion may be formed directly in the base plate when the light quantity adjusting device including the magnetic actuator is provided.

In the embodiment, the rotation limiting portion for limiting the rotation amount (range) of the rotor magnet 8 is formed in the portion of the meter base plate 5 on which the lever body 7b of the actuation transmitting lever 7 abuts. The rotation limiting portion may be formed in the base plate 1 having the opening portion 1a or in the second bobbin portion 6.

In the embodiment, the stator yoke 10 has a cylindrical shape having the pair of opposite projecting streaks 10a and 10b molded integrally on the inner circumference. The stator yoke 10 is the product of a compression mold formed with a powder metallurgy molding technique such as a firing technique using magnetic powder and resin, a sintering molding technique, an injection molding powder metallurgy technique (MIM molding), or a cold forging technique. With any of these techniques, the projecting streaks 10a and 10b are molded to be thicker than the body portion of the cylindrical stator yoke 10 toward the inner side of the body portion, that is, toward the rotor magnet 8 placed therein.

Next, the operation of the actuator will be described.

The stator yoke 10 forming part of the magnetic actuator in the embodiment includes the pair of projecting streaks 10a and 10b opposed to each other on the diameter line and formed on the inner circumference of the body portion of the stator yoke 10. The paired projecting streaks 10a and 10b are close to the rotor magnet 8 placed in the stator yoke 10 to readily pass magnet flux. For this reason, as shown in FIGS. 5(a) to 5(c), a large amount of magnetic flux passes in the paired projecting streaks 10a and 10b regardless of the rotation position of the rotor magnet 8. Especially, the peaks of the poles of the rotor magnet 8 at which the magnet flux is produced most are attracted significantly by a magnetic substance and are urged in a direction in which they are opposite to the paired projecting streaks 10a and 10b of the stator yoke 10.

Specifically, in FIG. 4, the peak of the N pole of the rotor magnet 8 is located on the right of the projecting streak 10a, while the peak of the S pole is located on the left of the other projecting streak 10b. Thus, the rotor magnet 8 will be rotated in the counterclockwise direction.

In this manner, more magnetic flux is concentrated on the paired projecting streaks 10a and 10b of the stator yoke 10 than in the other parts of the body portion of the stator yoke 10. Since the paired projecting streaks 10a and 10b are molded to have a larger thickness in section than in the other parts, they are not saturated magnetically and thus magnetic loss can be eliminated.

In this state, when electric current is passed through the coil, not shown, to rotate the rotor magnet in a direction opposite to the direction of the force resulting from the magnetic bias in the counterclockwise direction, that is, in the clockwise direction, then the state becomes more unstable magnetically to increase the force for returning to the totally closed state. The torque of the rotor magnet produced by the passage of electric current through the coil is transmitted via the actuation transmitting lever 7 to the shading members 2 and 3 as a driving force, for example, as shown in FIG. 1

The shading members 2 and 3 are translated through the engagement of guide grooves 2b and 3b formed in both sides of the shading members 2 and 3, respectively, with guide pins 1b of the base plate 1 to change the area of the opening of the light passing port 1a to adjust the light quantity passing through the light quantity adjusting device. Typically, the totally closed state means no electric current passes through the coil, while the totally opened state means the maximum electric current passes through the coil. In the embodiment, the two shading blades engage with the different engaging pins for translation, but another known light quantity adjusting device which drives one or two or more blades may be operated similarly. The shading blades may be not only translated but also pivoted.

As the shading members 2 and 3 are moved in the open direction, the magnetic bias is changed toward a higher level, and the force for returning the rotor magnet 8 to the totally closed state is increased. The power supplied to the coil is increased so as to exceed that force, which operates the shading members 2 and 3 to the totally opened state.

The supplied power can be adjusted to move and hold the shading members 2 and 3 at an arbitrary position. The rotation angle of the actuation transmitting lever 7 is limited by the rotation limiting portions 5a formed in the meter base plate 5 to prevent rotation beyond the angle range determined such that the maximum values of the range correspond to the rotation angle when the shading members 2 and 3 are located at the totally opened position and the rotation angle when they are located at the totally closed position and the center of the range corresponds to the position at the same angle in the different rotation directions with respect to the notation angles when the shading members 2 and 3 are located at the totally opened and closed positions. When the shading members 2 and 3 are held at the totally opened position or the totally closed position, the actuation transmitting lever 7 is urged to the rotation limiting portion by an electromagnetic force produced from the passage of electric current through the coil.

In the embodiment, as shown in FIG. 4, the magnetically stablest state in the stator yoke 10 is obtained when a line S-S' connecting the center of the stator yoke 10 with the centers of the paired projecting streaks 10a and 10b formed on the inner circumference of the stator yoke 10 is perpendicular to a boundary (line Q-Q') between the poles of the rotor magnet 8, that is, when the line Q-Q' coincides a line P-P'.

The most unstable state is obtained when the line Q-Q' coincides with the line S-S'. In ordinary use in the embodiment, the range of the line Q-Q' is set to be smaller than the range from the line P-P' to the line S-S', for example, between a line R-R' and a line T-T'.

When electric current through the coil is shut off, the line Q-Q' (the central axis of the lever body 7b of the actuation transmitting lever 7 in the longitudinal direction) is moved toward the line P-P' but is stopped at the position of the line R-R' by the rotation limiting portion described above. In the stop state, the urging force based on the force from the abovementioned magnet bias remains in the rotor magnet 8. The stop position is defined as the totally closed position of the shading members. This can urge the shading members 2 and 3 in the close direction (the counterclockwise direction) at all times to maintain the stable closed state.

The totally opened position of the shading members 2 and 3 is defined as the line T-T' before the line S-S'. This causes the stable urging force toward the line R-R' in the counterclockwise direction to be exerted at any position in the operation range of the rotor magnet 8. As a result, the stable operation can always be performed by adjusting the electric current passing through the coil.

FIGS. 3(a) to 3(c) show the concave portions 9a and 9b formed in the outer circumference of the second coil bobbin 9 fixed to the meter base plate 5 and the concave portion 6a formed in the outer circumference of the first coil bobbin portion 6 such that the paired projecting streaks 10a and 10b opposed to each other and formed integrally on the inner circumference of the stator yoke 10 are fitted into the concave portions 9a, 9b, and 6a to position and fix the stator yoke 10 to the coil bobbin.

In an assembly procedure, the coil bobbin is first placed at the position where the shading members 2 and 3 are held at the totally closed position by the rotation limiting portion after the electric current through the coil is shut off. When the position of the coil bobbin is determined, the arrangement of the concave portions 9a, 9b, and 6a formed in the outer circumference of the coil bobbin is automatically determined. Since the positional relationship between the paired projecting streaks 10a and 10b of the stator yoke 10 and the concave portions 9a, 9b, and 6a of the coil bobbin is previously set, the paired projecting streaks 10a and 10b of the stator yoke 10 can only be fitted into the concave portions 9a, 9b, and 6a of the coil bobbin to readily and stably achieve the appropriate position of the stator yoke 10 in the rotation direction. This can omit the work steps for performing fine adjustments of the position of the stator yoke 10 in the rotation direction and for fixing the position in the rotation direction with an adhesive or the like.

In other words, the concave portions 9a, 9b, and 6a serving as the positioning portion for positioning the paired projecting streaks 10a and 10b formed on the inner circumference of the stator yoke 10 for producing the urging force with respect to the rotation limiting portion for limiting the rotation range of the rotor magnet 8 can be formed integrally on the coil bobbin to readily realize the magnetic actuator or the light quantity adjusting device having a stable magnetic property.

In the abovementioned embodiment, the two projecting streaks serving as protrusions are formed on the inner circumference of the stator yoke 10, but one or three projecting streaks may be formed. While the projecting streaks also serve as a means for positioning relative to the coil bobbin, different projecting streaks for positioning may be provided.

The paired projecting streaks 10a and 10b of the stator yoke 10 are fitted into or engage with the concave portions 9a, 9b, and 6a of the coil bobbin to achieve positioning in the embodiment. However, the positioning may be performed by fitting into the meter base plate or the aperture stop case (sheet metal) 4 instead of the coil bobbin.

Figure 6:
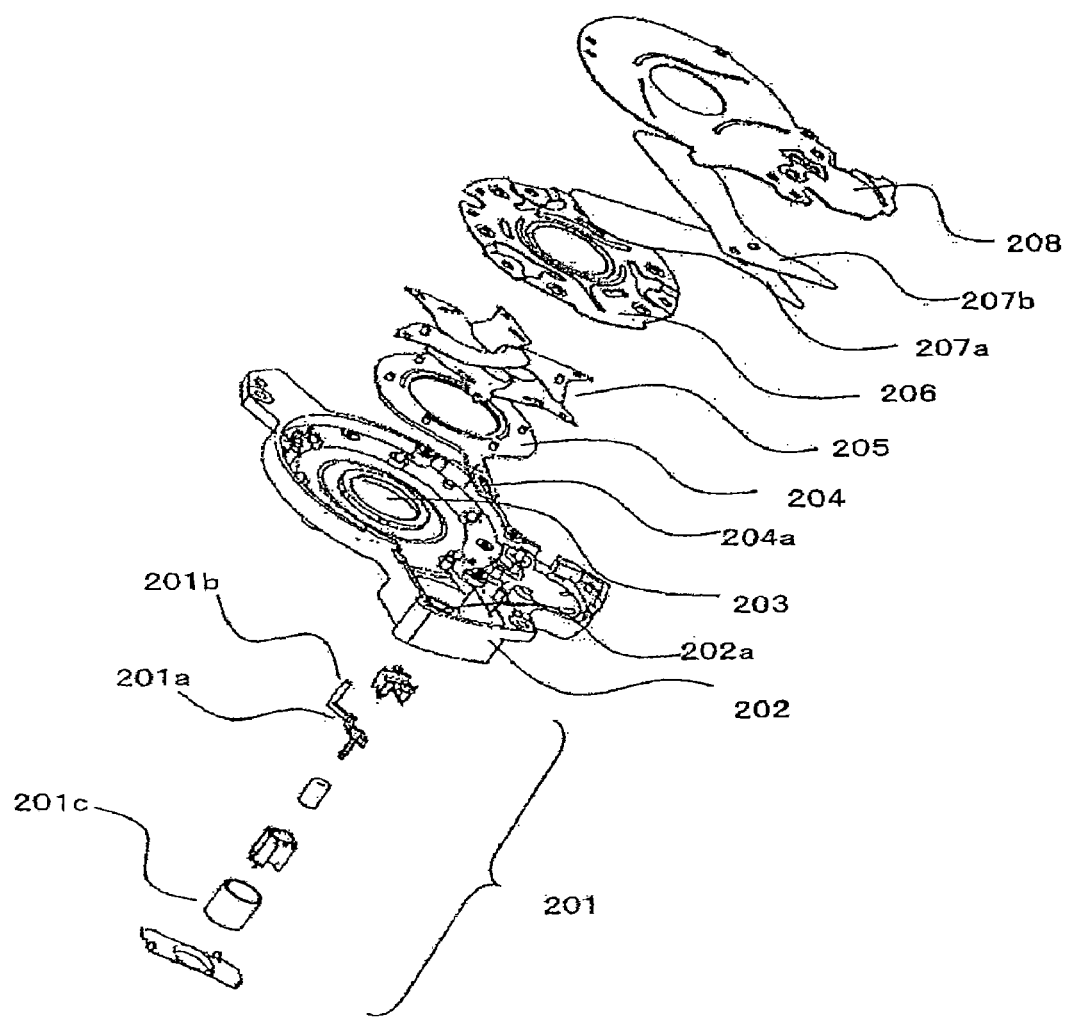
FIG. 6 is an exploded perspective view showing an embodiment in which the magnetic actuator shown in FIGS. 1 to 5 is applied to another light quantity adjusting device.
Figure 7:
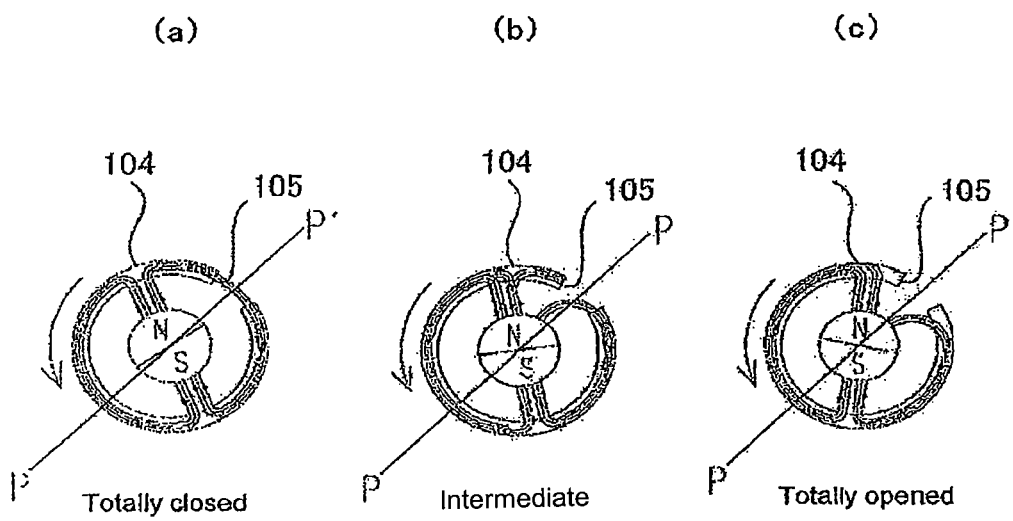
FIGS. 7(a) to 7(c) are diagrams for explaining operation of a conventional magnetic actuator with a slit yoke and a shading member in a totally closed state, an intermediate state, and a totally opened state in the related art.
Figure 8:
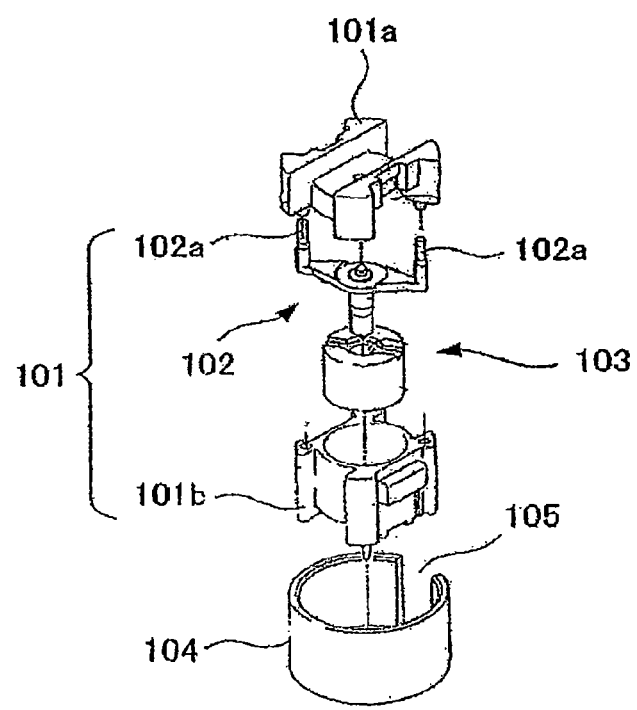
FIG. 8 is an exploded perspective view showing a magnetic actuator in the related art.

FIG. 6 shows an embodiment in which the abovementioned magnetic actuator is used in another light quantity adjusting device.

A magnetic actuator 231 is formed of the same components as those described in the above embodiment and is directly positioned and fixed to a base plate 202 having an opening 203 formed therein. An actuation transmitting lever 201a has a single engagement pin 201b unlike the above embodiment. The engagement pin 201b passes through an elongated hole 202a in the base plate 202 and engages with an elongated hole 204a of an actuating ring 204. The actuating ring 204 is rotatably attached around the opening 203 of the base plate 202. The actuating ring 204 actuates and rotates a plurality of shading members 205 (six in the embodiment) to change the aperture of the opening portion 203 of the base plate 202.

The elongated hole 202a formed in the base plate 202 corresponds to a rotation limiting portion for limiting the rotation range of a rotor magnet of the magnetic actuator 201. The engagement pin 201b abuts on the inner end of the elongated hole 202a to limit the rotation range of the rotor magnet.

Reference numeral 206 shows an aperture stop case attached to the base plate 202 and providing the space in which the actuating ring 204 and the shading members 205 are operated. The embodiment further includes shutter blades 207a and 207b driven by another actuator, not shown and different from the magnetic actuator 201, to open or close the opening portion 203. The actuating ring 204 and the shutter blades 207a and 207b are attached to the base plate 202 with a cover plate 208.

In the configuration described above, the rotation range of the actuation transmitting lever 201a of the magnetic actuator 201 is limited by a stator yoke 201c formed in a similar manner to that in the above embodiment and the rotation limiting portion (elongated hole 202a) formed in the base plate 202. This determines the rotation amount of the actuating ring 204, so that the opened position and the closed position when the shading members 205 are rotated are precisely determined.

After the shading members 205 determine the opening size of the opening portion 203, the shutter blades 207a and 207b are driven by the actuator, not shown, to open or close the opening.

In the embodiment, the actuating ring 204 is interposed between the actuation transmitting lever 201a and the shading members 205, but the engagement pin 201b of the actuation transmitting lever may directly engage with and rotate the shading members 205. While the plurality of shading members are provided, a single shading member may be used instead.

According to the magnetic actuator of each of the above-mentioned embodiments, the cylindrical shape of the stator yoke reduces the tendency to saturate and provides high radial crushing strength to increase resistance to deformation as compared with the slit yoke.

The stator yoke having the protrusions formed on the inner circumference is positioned to the bobbin or the base plate serving as the rotation limiting member or the attachment member such as the actuating portion to allow the appropriate limitation of the rotation range of the rotor magnet. This can readily and stably achieve the relationship between the urging force based on the magnetic bias of the stator yoke and the rotation range of the rotor magnet. It is also possible to omit the work steps for performing fine adjustments of the position of the stator yoke in the rotation direction and for fixing the position in the rotation direction with an adhesive or the like, so that an inexpensive magnet-c actuator can be provided.

In application of the magnetic actuator to the light quantity adjusting device, the stator yoke can only be mounted on the bobbin or a holding member of the actuating portion to provide the light quantity adjusting device capable of controlling the shading member properly.

In addition, since the protrusions of the stator yoke opposite to the rotor magnet on which the magnet flux is concentrated have the thickness larger than that of the other cylindrical portion, magnetic loss can be reduced to provide the magnetic actuator and the light quantity adjusting device with high efficiency.

While preferred embodiments have been described, it is to be understood that modification and variation of the present invention may be made without departing from the spirit or scope of the following claims.

What is claimed is:

1. A magnetic actuator comprising:
   a rotor magnet which is formed of a rotatable permanent magnet;
   a rotation limiting member which has a rotation limiting portion for limiting a rotation range of the rotor magnet;
   a stator yoke which is formed in a generally cylindrical shape, is placed around a rotation axis of the rotor magnet, and has at least one protruding portion which protrudes toward the rotor magnet and produces an urging force based on magnetic bias between the stator yoke and the rotor magnet and a positioning portion positionable with respect to the rotation limiting member; and
   a coil which is placed inside the stator yoke and opposite to the rotor magnet and produces magnetism for actuating rotation of the rotor magnet.

2. The magnetic actuator according to claim 1, wherein the protruding portion of the stator yoke also serves as the positioning portion of the stator yoke.

3. The magnetic actuator according to claim 1, wherein the positioning portion of the stator yoke is fitted into the rotation limiting member to position the protruding portion of the stator yoke in a rotation direction of the rotor magnet.

4. The magnetic actuator according to claim 1, wherein the positioning portion of the stator yoke is fitted into a concave portion of a coil bobbin around which the coil is wound, and the coil bobbin is positioned and fixed to the rotation limiting member.

5. The magnetic actuator according to claim 1, wherein the rotation limiting member is a coil bobbin around which the coil is wound.

6. The magnetic actuator according to claim 1, wherein the protruding portion of the stator yoke is formed integrally to have a larger thickness in section than in the remaining portion of the generally cylindrical shaped stator yoke, and the stator yoke is formed through compression molding with a powder metallurgy molding technique including the protruding portion and the positioning portion.

7. A light quantity adjusting device comprising:
   a shading member which is moved relative to a base plate having an aperture formed therein to control a quantity of light adjusted by said light quantity adjusting device;
   a magnetic actuator which is an actuating source for moving the shading member with a rotor magnet formed of a rotatable permanent magnet; and
   a power transmitting member which is rotated together with the rotor magnet to actuate the movement of shading member,
   wherein the magnetic actuator includes:
   the rotor magnet which is formed of the rotatable permanent magnet;
   a rotation limiting member which has a rotation limiting portion for limiting a rotation range of the rotor magnet;
   a stator yoke which is formed in a generally cylindrical shape, is placed around a rotation axis of the rotor magnet, and has at least one protruding portion which protrudes toward the rotor magnet and produces an urging force based on magnetic bias between the stator yoke and the rotor magnet and a positioning portion for positioning with respect to the rotation limiting member; and
   a coil which is placed inside the stator yoke and opposite to the rotor magnet and produces magnetism for actuating the rotor magnet.

8. The light quantity adjusting device according to claim 7, wherein the protruding portion of the stator yoke also serves as the positioning portion of the stator yoke.

9. The light quantity adjusting device according to claim 7, wherein the positioning portion of the stator yoke is fitted into the rotation limiting member to position the protruding portion of the stator yoke in a rotation direction of the rotor magnet.

10. The light quantity adjusting device according to claim 7, wherein the positioning portion of the stator yoke is fitted into a concave portion of a coil bobbin around which the coil is wound, and the coil bobbin is positioned and fixed to the rotation limiting member.

11. The light quantity adjusting device according to claim 7, wherein the rotation limiting member is a coil bobbin around which the coil is wound.

12. The light quantity adjusting device according to claim 7, wherein the protruding portion of the stator yoke is formed integrally to have a larger thickness in section than in the remaining portion of the generally cylindrical shaped stator yoke, and the stator yoke is formed through compression molding with a powder metallurgy molding technique including the protruding portion and the positioning portion.

13. The light quantity adjusting device according to claim 7, wherein the shading member is held at a totally closed position where the shading member completely closes the aperture by the urging force based on the magnetic bias in shutoff of electric current through the coil.

* * * * *

UNITED STATES PATENT AND TRADEMARK OFFICE
CERTIFICATE OF CORRECTION

PATENT NO. : 7,513,703 B2
APPLICATION NO. : 11/948460
DATED : April 7, 2009
INVENTOR(S) : Higashiyama Yasuyuki It is certified that error appears in the above-identified patent and that said Letters Patent is hereby corrected as shown below:

COVER PAGE AT ITEM [73]:
Assignee, "Canon Kabushiki Kaisha, Tokyo (JP)" should read --Canon Denshi Kabushiki Kaisha, Chichibu, Saitama (JP)--.

Signed and Sealed this

Seventeenth Day of November, 2009

David J. Kappos
*Director of the United States Patent and Trademark Office*